United States Patent [19]

Hammer

[11] Patent Number: 4,772,946
[45] Date of Patent: Sep. 20, 1988

[54] METHOD FOR DATA REDUCTION OF DIGITAL PICTURE SIGNALS BY VECTOR QUANTIZATION OF COEFFICIENTS ACQUIRED BY ORTHONORMAL TRANSFORMATION BY MEANS OF A SYMMETRICAL, NEARLY CYCLICAL HADAMARD MATRIX

[75] Inventor: Bernard Hammer, Pfaffing, Fed. Rep. of Germany

[73] Assignee: Siemens Aktiengesellschaft, Berlin & Munich, Fed. Rep. of Germany

[21] Appl. No.: 938,143

[22] Filed: Dec. 4, 1986

[30] Foreign Application Priority Data

Dec. 4, 1985 [DE] Fed. Rep. of Germany ....... 3542931

[51] Int. Cl.$^4$ .............................................. H04N 7/12
[52] U.S. Cl. .................................... 358/133; 358/135; 358/136
[58] Field of Search .................. 358/12, 133, 140, 141, 358/11, 138, 135, 136

[56] References Cited

U.S. PATENT DOCUMENTS

| | | | |
|---|---|---|---|
| 4,047,221 | 9/1977 | Yasuda et al. | 358/136 |
| 4,051,530 | 9/1977 | Kuroda et al. | 358/138 |
| 4,558,350 | 12/1985 | Murakami | 358/133 |
| 4,580,162 | 4/1986 | Mori | 358/135 |
| 4,597,010 | 6/1986 | Carr | 358/133 |
| 4,633,296 | 12/1986 | Cham et al. | 358/133 |
| 4,639,778 | 1/1987 | Yamaguchi et al. | 358/138 |
| 4,672,441 | 6/1987 | Hoelzliomimer et al. | 358/135 |

OTHER PUBLICATIONS

Siemens Forschungs-und Entwicklungs Bericht, vol. 13, (1984), No. 3, pp. 105–108.
Frequenz, 39 (1985), pp. 226–234.

*Primary Examiner*—James J. Groody
*Assistant Examiner*—John K. Peng
*Attorney, Agent, or Firm*—Hill, Van Santen, Steadman & Simpson

[57] ABSTRACT

A method and apparatus for data reduction of digital picture signals by vector quantizing of coefficient acquired by orthonormal transformation using a symmetrically, nearly cyclical Hadamard matrix, includes means for deriving a mean value coefficient and a plurality of structure coefficients from a plurality of blocks formed from the input signal and resorted by means of a Peano curve, said coefficients being in part only scalarly quantized, and in part scalarly and vectorly quantized. The apparatus and method allows a noise amplitude of the picture signal acquired after back transformation to be adapted to visibility thresholds of the human visual system according to CCIR recommendation 500-1.

5 Claims, 2 Drawing Sheets

METHOD FOR DATA REDUCTION OF DIGITAL PICTURE SIGNALS BY VECTOR QUANTIZATION OF COEFFICIENTS ACQUIRED BY ORTHONORMAL TRANSFORMATION BY MEANS OF A SYMMETRICAL, NEARLY CYCLICAL HADAMARD MATRIX

BACKGROUND

The present invention relates to a method for data reduction of digital picture signals by vector quantization of coefficients, acquired by orthonormal transformation by means of a symmetrical, nearly cyclical Hadamard matrix, in which an incoming picture signal is divided into blocks before the transformation, the blocks are reordered into vectors according to a Peano curve for acquiring an input vector, and a mean value coefficient and a plurality of structure coefficients are formed by the transformation.

In recent years, great interest has arisen for data reduction of pictures, for example, for employment for video moving pictures within new digital communication networks, for example the ISDN (Integrated Services Digital Network). Areas of application for this, for example, lie in the field of what is referred to as tele-conferencing or of picture telephones at transmission rates of 2 Mbit/s down to 64 kbit/s.

Method for data reduction of digital picture signals which use vector quantization, with a spatial and temporal grouping of the picture elements, have proven promising for achieving good results. Vector quantization seems inherently superior to other, known source coding methods, since the rate distortion theory indicates a data reduction with optimum results, provided that the vector dimension is sufficiently high.

Vector quantization regards to a block of successive samples, for example, of a picture, as a vector which is quantized as a unit. In contrast to a scalar quantization, vector quantization takes the statistical dependencies of the samples into consideration.

A vector quantizer seeks a k-dimensional vector, from a finite set of output vectors, which exhibits the greatest similarity to the input signal. By means of what is referred to as a code book, this vector is coded with a binary code word having the length $L = \log_2 N$, where N indicates the number of the output vectors or the size of the code book. Differing from scalar quantization, the plurality $R = L/k$ of the bits which are required in order to code a vector component can be a fraction of one.

The main hurdle in employing vector quantization is its complexity, which rises exponentially with R and k, i.e. a vector quantizer of the size k which works at a rate of Rbits/component requires $k2^{Rk}$ operations for coding, and likewise requires a code book memory size of the same order. In most applications for vector quantizing, therefore, the block size k is limited to 16. Various problems have arisen, particularly with such small block sizes, since the vector quantizing tends to generate the occurrence of a highly visible noise in the proximity of the block boundaries of a decoded picture. These quantizing errors are of basically two types, namely, formation of step-shaped edges, caused by independent coding of the picture blocks; and sudden changes of the gray scale from block to block, whereby the gray scales of the original picture gradually change (block contouring).

SUMMARY OF THE INVENTION

In order to overcome these problems, a vector quantizing with what is referred to as a M-Hadamard-transformation (MHT) is employed. This type of transformation is well-suited to prevent so-called contouring effects.

The principles of the M-Hadamard-transformation respectively proceed from Siemens Forschungs-und Entwicklungsberichte, Volume 13 (1984), No. 3, pages 105–108, and "Frequenz" 39 (1985) 7/8, pages 226–234. The dissertation "Transformationscodierung von digitalisierten Grautonbildern mit M-Sequenzen" by Bernard Hammer (1981) is concerned in detail with the problematics of transformation coding.

The previously known transformation method has the disadvantage that the hardware outlay for the required memories is relatively high, that the number of required search steps for finding the most suitable entry into the code book is relatively great, and that the size of required arithmetic units is relatively high as a consequence of the necessary, great word width. The plurality of search steps for finding a suitable entry in the code book rises exponentially with the plurality of entries. As a consequence of the multiplication steps required in the previously known method, the outlay for processing time rises steeply and a highly complicated hardware is required.

The object of the present invention is to provide a method of data reduction wherein the various disadvantages which affect the prior art are avoided In particular, a method is provided for which the need for multiplication operations is eliminated, and which requires a relatively small memory outlay and a relatively short processing time.

These objects are achieved by a method of data reduction using a Hadamard matrix, in which input vectors are scalarly quantized, and a difference value is developed relative to immediately preceding data, the difference is normalized and vector quantized, and the quantized coefficients are coded and stored as transmitted. For reproduction, the stored or coded coefficients are subjected to an inverse transformed and used to compose a picture signal.

Advantageous developments of the invention are characterized by the features recited in the subclaims.

BRIEF DESCRIPTION OF THE DRAWINGS

The present invention is set forth in greater detail below, with reference to a number of drawings relating to exemplary embodiments of the invention.

DESCRIPTION OF THE PREFERRED EMBODIMENT

Figure 1:
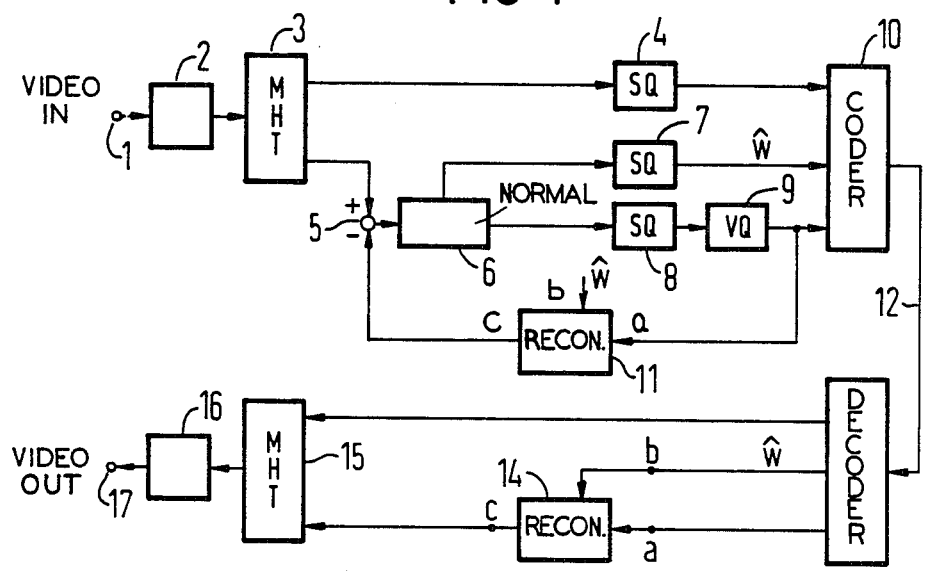
FIG. 1 shows a block circuit diagram of an arrangement by means of which the method of the invention is to be implemented.

As already explained, FIG. 1 shows a circuit arrangement for the implementation of the method of the invention, whereby the illustrated circuit arrangement represents a preferred exemplary embodiment of the execution of such a circuit arrangement.

In accord with FIG. 1, an input terminal 1 is provided via which the video input signal VIDEO IN to be transformed is input. A block-forming stage 2 is connected between the input terminal 1 and a transformation stage 3. The transformation stage 3 is connected to a first quantization stage 4 for scalar quantization of mean value coefficients, via a first output for mean value coefficients, and the stage 3 is connected to a first input of a subtraction element 5, via a second output for structure coefficients. An output of the subtraction element 5 is connected via a normalization stage 6 to a second quantization stage 7 for scalar quantization of a span width coefficient, and to a third quantization stage 8 for scalar quantization of structure coefficients. The first quantization stage 4 and the second quantization stage 7 are directly connected to a coder 10, and the third quantization stage 8 is connected to the coder 10 via a vector quantizer 9. The outputs of the stage 7 and the vector quantizer 9 are connected to an input of a reconstruction stage 11 whose output is connected to a second input of the subtraction element 5. The output of the coder 10 is connected via a transmission channel 12 to a decoder 13 at the reception side. A first output for mean value coefficients is connected from the decoder 13 to a first input of a transformation stage 15, and a second output for span width coefficients is connected from decoder 13 to a first input of a reconstruction stage 14, and third output for error coefficients is connected to a second input of the reconstruction stage 14. An output of the reconstruction stage 14 is connected to a second input of the transformation stage 15. An output of the transformation stage 15 is connected via a block forming stage 16 to an output terminal 17, via which the retrieved video output signal (VIDEO OUT) is made available.

In accord with the invention, the method of data reduction of digital picture signals by vector quantization provides in detail that the structure coefficients approximately represent a series development of the variable part of the input vector based on pseudo-random functions. The mean value coefficient w of each of the input vectors is scalarly quantized in the appertaining quantization stage. The structure coefficients of each of the input vectors are respectively supplied to the substraction element 5 in which the difference between the structure coefficients of the momentary input vector and the reconstructed, quantized structure coefficient of the corresponding input vector of the picture preferably immediately preceding in chronological terms is formed. This difference is supplied to the normalization element 6 in which the difference is divided by a value for the span width of the distribution of the coefficient amplitudes.

Every normalized structure coefficent which has arisen by this division is respectively subjected to a uniform, scalar quantizing. The value for the span width is likewise subjected to a scalar quantizing, namely, in the second quantization stage 7. The vector of the quantized difference of the structure coefficients is subjected to a vector quantizing by means of the vector quantizer 9 wherein a vector for the input vector is sought from a code book, as an entry in this code book which represents the input vector with the minimum, mean squared error.

The scalarly quantized mean value coefficient, the scalarly quantized value for the span width, and the index of that code book entry which represents the vector-quantized difference of the structure coefficients having the minimum mean quadratic error, are coded in common in the coder 10 to form a data-reduced output signal, this output signal being stored and/or transmitted, and after the transmission, being decoded in the decoder 13 for the acquisition of a picture signal similar to the original picture signal, whereupon a value for the span width w and the index are processed in the reconstruction stage 14 to form a reconstructed structure vector corresponding to the corresponding, original, quantized structure vector.

A mean value coefficient acquired by the decoding and the reconstructed structure vector are subjected in common to a back-transformation which is inverse to the transformation at the input side. The output vectors arising by the back-transformation which is executed by the transformation stage 15 at the receive side are reordered into blocks inversely based on a Peano curve used at the input side and the blocks successively arising therefrom are composed to form the similar picture signal which is subsequently output via the output port 17.

Figure 2:
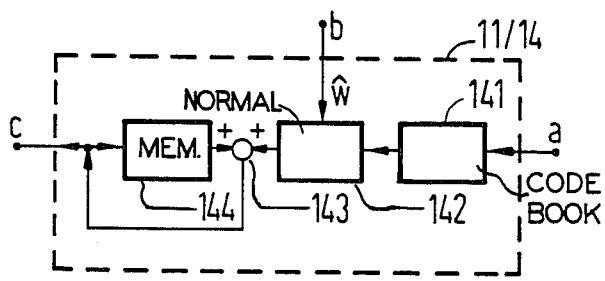
FIG. 2 shows a block circuit diagram of reconstruction units shown in FIG. 1.

FIG. 2 shows the details of the reconstruction units 11 and 14, namely, a code book 141, an inverse normalization stage 142, an adder 143, and a memory 144, interconnected as shown in FIG. 2. The terminals a, b, c of the reconstruction units 11 or, respectively, 14 or FIG. 2 thereby correspond to the terminal posts a/a, b/b, c/c shown in FIG. 1.

It is further provided in accord with the invention that, for the selection of that vector in the code book (code book vector) which is intended to represent the input vector with the smallest mean quadratic error, that code book vector is sought for which the span width of the elements of the diffence vector from the input vector and code book vector is a minimum.

Figures 3, 4:
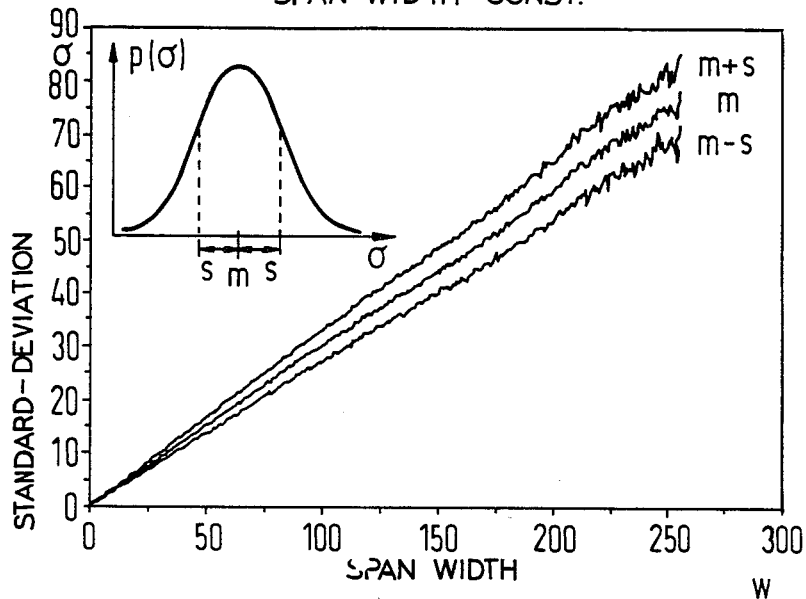
FIG. 3 shows a diagram having curves showing the relationships between the span width and the standard deviation of MHT coefficients.
FIG. 4 shows a symbolic illustration of a MHT matrix.

FIG. 3 shows a diagram having a set of curves showing the relationships between the span width w and the standard deviation of MHT coefficients, together with expressions for the scan width w and the standard deviation $\sigma$.

Three curves, identified as m, m+s and m−s show the standard deviation in relation to span width and the insert curve in FIG. 3 shows the shape of p($\sigma$) in relation to $\sigma$, m and s.

It is also provided in accord with the invention, that the elements of the representing code book vectors are scalarly quantized, normalized differences of structure coefficients, so that the noise amplitude is adapted to the visibility thresholds of the human visual system under observation conditions according to CCIR recommendation 500-1.

It is advantageously provided in accord with a development of the invention that the blocks formed at the input of the circuit arrangement are formed of 4×4 picture points and that the information representation of the differences of the structure coefficients of a block is reduced to 3 bits/coefficient. Of course, other block formations of picture points, for example, 8×8 and the like, are possible. The blocks of 4×4 picture elements, however, seem optimum.

Figure 5:
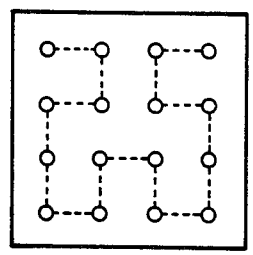
FIG. 5 schematically shows a Peano curve for reclassifying the elements of a 4×4 block into a vector having the dimension 16.

FIG. 4 shows the order of the MHT matrix and FIG. 5 shows a Peano curve applying to the apparatus of the invention.

From the forgoing, it will be understood that the present invention supplies a data reduction method which avoids the need for any multiplying step, and which requires a minimal amount of memory.

Various additions and modifications may be made in the method of the present invention without departing from the essential features of novelty thereof, which are intended to be defined and secured by the appended claims.

What is claimed is:

1. A method for the data reduction of digital picture signals by vector quantizing of coefficients acquired by an orthonormal transformation using a symmetrical, cyclically Hadamard matrix comprising the steps of;
    sub-dividing an input picture signal into blocks before the transformation,
    reordering said blocks into vectors according to a Peano curve for acquiring an input vector and for deriving a mean value coefficient and a plurality of structure coefficients from said blocks, said structure coefficients approximately representing a series development of the variable component of the input vector based on a pseudo-random function,
    performing a first scalar quantization of the mean value component of each of the input vectors,
    subtracting the structure coefficients of each of the input vectors from previous reconstructed quantized structure coefficients of the corresponding input vector,
    supplying the difference resulting from said subtraction to a normalization element for dividing the difference by a value for the span width of the distribution of the coefficient amplitudes,
    performing a uniform scalar quantizing on each normalized structure coefficient resulting from said division,
    performing a second scalar quantizing on the value for the span width,
    performing a vector quantizing on the quantized difference of the structure coefficients in which a code book entry is sought representing the input vector having the minimum, mean squared error,
    coding the scarlarly quantized mean value coefficient, the scalarly quantized value for the span width and the index of the code book entry representing the vector quantized difference of the structure coefficients having the minimum mean squared error to form a data-reduced output signal,
    decoding said data reduced output signal for developing a picture signal similar to the original picture signal, by processing a value for the span width and the index to form a reconstructed structure vector corresponding to the original quantized structure vector,
    subjecting a mean value coefficient acquired by the decoding to an inverse back transformation, in common with said reconstructed structure vector,
    reordering output vectors produced by said back transformation in blocks according to said Peano curve, and composing successive blocks to form said similar picture signal.

2. The method according to claim 1, wherein said second scalar quantizing comprises the step of selecting that vector in the code book which represents the input vector having the smallest mean squared error by selecting the code book vector for which the span width of the elements of the difference vector is the minimum.

3. The method according to claim 1, wherein the elements of the code book vectors are scalarly quantized normalized differences of structure coefficients, whereby the noise amplitude of said similar picture is adapted to predetermined visibility thresholds.

4. The method according to claim 1, including the steps of forming said blocks in the form of 4×4 picture points, and deriving structure coefficients representative of the said differences in the form of three bits per coefficient.

5. Apparatus for data reduction of digital picture signals by vector quantizing of coefficients acquired by an orthonormal transformation using a symmetrically, cyclical Hadamard matrix comprising, in combination;
    an input terminal for supplying a video input signal to be transformed,
    a block forming stage connected to said input terminal, a transformation stage connected to the output of said block forming stage,
    a first quantization stage connected to said transformation stage for scalar quantization of the mean value coefficients,
    a subtraction stage having a first input connected to the output of said transformation stage,
    a normalization stage connected to the output of said subtraction stage,
    a second quantization stage connected to an output of said normalization stage for scalar quantizing of a span width coefficient,
    a third quantization stage connected to a output of said normalization stage for scalar quantizing of structure coefficients,
    a coder connected to the outputs of said first and second quantization stages,
    a vector quantizer connected to the output of said third quantization stage and having an output connected to an input of said coder,
    a reconstruction stage having a pair of inputs connected respectively to the output of said second quantization stage and the output of said vector quantizer, the output of said reconstruction stage being connected to a second input of said subtraction stage,
    a decoder connected to receive the output of said coder,
    a transformation stage connected to receive mean value coefficients from said decoder,
    a reconstruction stage connected to receive span width coefficients and error coefficients from said decoder, the output of said reconstruction stage being connected to a second input of said transformation stage, and
    a recombination stage interconnected between the output of said transformation stage and a video output terminal.

* * * * *